United States Patent [19]
DeVincent et al.

[11] 3,929,357
[45] Dec. 30, 1975

[54] QUICK CONNECT COUPLING WITH TANDEM SNAP RINGS

[75] Inventors: Patsy DeVincent; John F. Wiechart, both of Dayton, Ohio

[73] Assignee: General Motors Corporation, Detroit, Mich.

[22] Filed: Nov. 13, 1974

[21] Appl. No.: 523,432

[52] U.S. Cl. .......................... 285/319; 285/DIG. 25
[51] Int. Cl.² .......................................... F16L 39/00
[58] Field of Search ..... 285/319, 321, 305, DIG. 25

[56] References Cited
UNITED STATES PATENTS
| | | | |
|---|---|---|---|
| 1,533,886 | 4/1925 | Mueller et al. | 285/382.5 X |
| 3,453,005 | 7/1969 | Foults | 285/321 X |

FOREIGN PATENTS OR APPLICATIONS
| | | | |
|---|---|---|---|
| 566,359 | 8/1957 | Italy | 285/319 |

*Primary Examiner*—Dave W. Arola
*Attorney, Agent, or Firm*—Arthur N. Krein

[57] ABSTRACT

A quick connect coupling for conduits carrying a fluid under pressure comprises a socket and a plug which is inserted into the socket and which is in sealing relation with the socket when fully inserted therein. The plug carries a retainer cup, the rim of which has the leafs of a tandem snap ring retainer extending therethrough, the leafs being positioned to sequentially engage an annular radial shoulder on the exterior of the socket to effect axial positioning and retention of the plug within the socket.

3 Claims, 4 Drawing Figures

U.S. Patent   Dec. 30, 1975   3,929,357
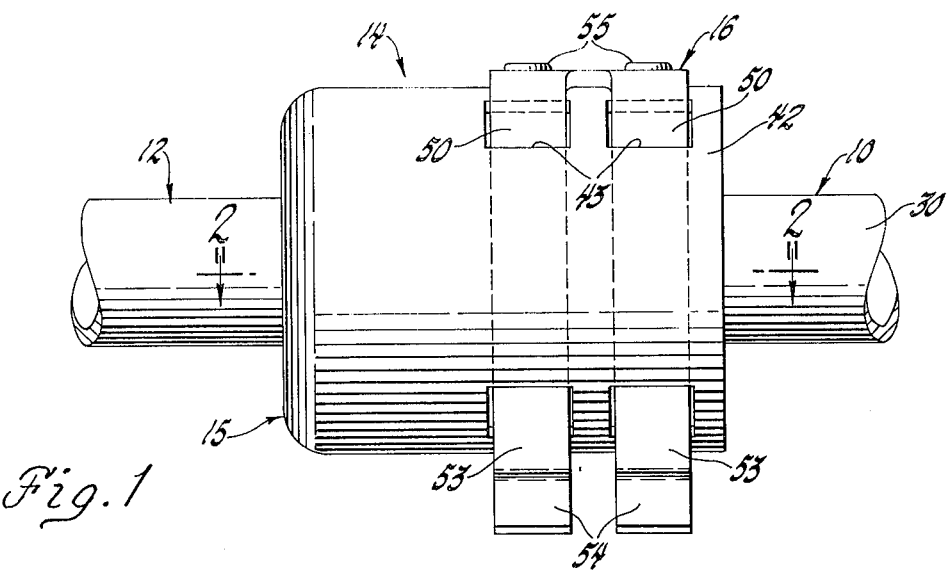
Fig. 1
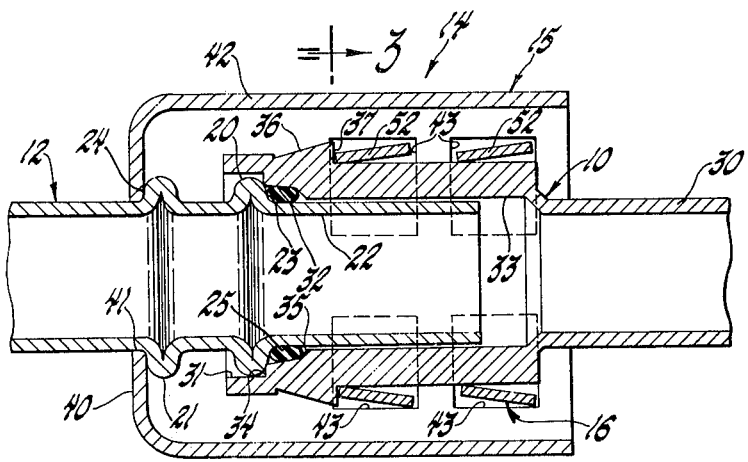
Fig. 2
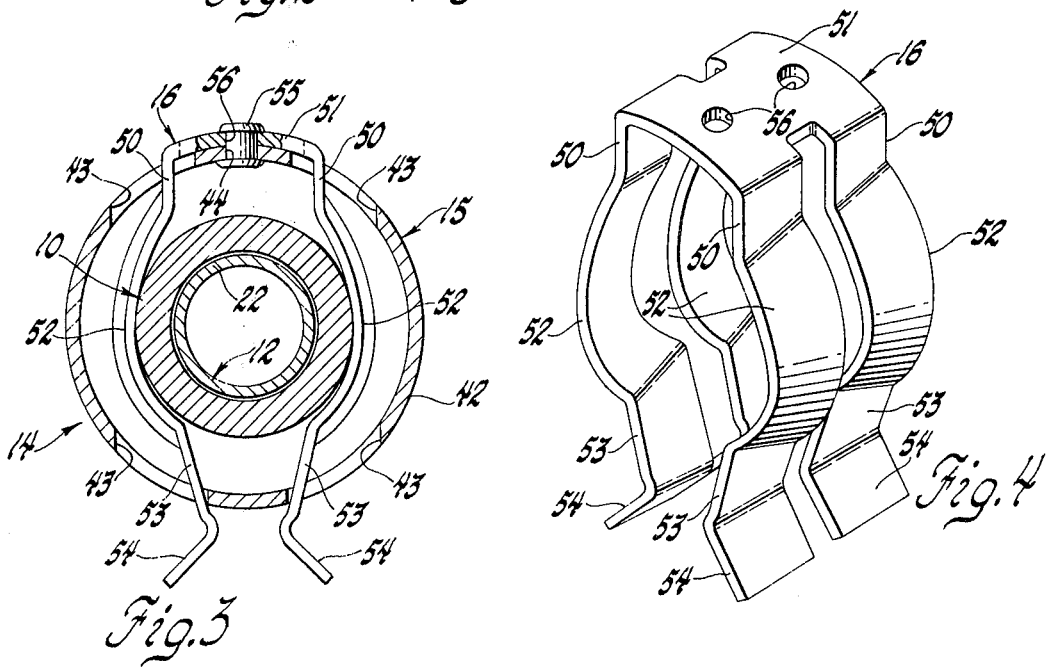
Fig. 3
Fig. 4

QUICK CONNECT COUPLING WITH TANDEM SNAP RINGS

This invention relates to a conduit coupling and, in particular, to a quick connect coupling with tandem snap ring.

In various systems, conduits are connected together by a suitable coupling, such as a quick connect coupling, to carry fluids under pressure from a source of pressurized fluid, such as a compressor in an air conditioner system. In such a system, even though the compressor may not be in operation, fluid under pressure may still be present in the conduits when it is necessary to disconnect them from the source of pressurized fluid. To effect disconnection of the conduits, it is preferable that the coupling should be so constructed to permit partial disconnection of the conduits so as to permit venting of fluid pressure from the conduits before they are completely disconnected.

Accordingly, a primary object of this invention is to improve a quick connect coupling whereby a retention cup carrying a tandem snap ring retainer is carried by the plug insertable into a socket whereby adjacent snap rings of the tandem snap ring retainer are positioned to sequentially engage a shoulder on the socket to effect coupling of the plug to the socket.

Another object of this invention is to provide a coupling for conduits which may be readily disconnected without the use of a special tool and which has an intermediate disconnect position to permit fluid pressure within the conduits to leak off prior to total disengagement of the coupling elements.

A still further object of this invention is to provide a simple and reliable snap together coupling for connecting together tubular conduits.

These and other objects of the invention are obtained by means of a quick connect coupling comprising a plug in the form of a double beaded tube with a seal ring encircling a pilot end portion thereof that is inserted into a socket and is in sealing relation thereto when fully inserted therein. A retention cup mounted on the plug behind a bead thereon has the rim portion thereof of a diameter to encircle the socket, the rim carrying a tandem snap ring retainer, the legs of the snap rings projecting through the retainer cup in position for sequential engagement with the radial shoulder of an annular flange on the exterior of the socket.

For a better understanding of the invention, as well as other objects and further features thereof, reference is had to the following detailed description of the invention to be read in connection with the accompanying drawings, wherein:

FIG. 1 is an elevational view of the tandem snap ring quick connect coupling of the invention, this coupling being shown as being fully coupled and locked together;

FIG. 2 is a sectional view of the coupling of FIG. 1 taken along line 2—2 of FIG. 1;

FIG. 3 is a sectional view of the coupling taken along line 3—3 of FIG. 2; and,

FIG. 4 is a perspective view of the tandem snap ring retainer, per se, of the subject coupling.

Referring now to the drawings, the quick connect coupling of the invention comprises an outer female member or socket 10, an annular apertured inner male plug 12 and a tandem snap ring retainer, generally designated 14, which includes a retention cup 15, mounted on the male plug 12, and a tandem snap ring 16 which projects radially through the retention cup 15 for engagement with the exterior of the socket 10. The plug 12 is slidably received in the socket 10 to couple two fluid conduits together. These conduits may be, for example, tubes, pipes or flexible hoses. The socket 10 may be a separate element with a conduit suitably secured thereto or, as shown, it may be formed as an integral part of a tube 30. Tubular plug 12 may also be formed as a separate element with a conduit suitably secured thereto or, as shown, it may be formed as an integral mating end portion of a tube.

Thus, in the embodiment shown, the plug 12 is in the form of a tube provided at one end thereof with a pair of axial spaced apart annular external beads 20 and 21 which may be upset, as shown, or otherwise provided on the tube to extend radially outward from the nominal outside peripheral surface from the plug tube, the bead 20 being spaced a predetermined axial distance from the front or coupling end of the tube, the right-hand end as seen in FIG. 2, to provide a cylindrical pilot portion 22. Bead 20 thus provides a radial shoulder 23 facing the pilot portion end of the tube, while the bead 21 provides a radial retainer shoulder 24 facing in the opposite direction from the shoulder 23 and which is located outside of the socket 10 when the plug 12 is fully inserted therein for a purpose to be described. A seal ring 25, in the form of an O-ring, is positioned to encircle the pilot portion 22 preferably in abutment against the shoulder 23 of bead 20.

Socket 10, in the embodiment illustrated, is formed integral with a tube 30 at one end thereof and is provided with a stepped bore therethrough which includes at least in succession a first bore extending from the front face of the socket to form a peripheral or cylindrical wall 31 of a diameter greater than the outside diameter of the bead 20 on the tube of plug 12, a second bore, preferably inwardly tapered and of a reduced diameter to form a cylindrical wall 32 providing with the pilot portion 22 of the plug a cylindrical cavity for the seal ring 25. The wall 32 may be axially disposed or, as shown, it is preferably inclined at an acute angle, for example, 5°, to the axis of the stepped bore, and a third bore of a still further reduced diameter forming a cylindrical wall 33 in which the pilot portion of the plug is slidably received. The cylindrical walls 31 and 32 are interconnected by a radial shoulder 34 extending therebetween which forms an abutment for the shoulder 23 of bead 20 when the plug is fully inserted into the socket. In addition, the cylindrical walls 32 and 33 are interconnected by a radial shoulder 35, which may be chamfered to assist in centering the pilot portion 22 of the plug 12 during assembly of this element in the socket.

In the fully inserted position of the plug 12 into socket 10, the position shown in FIG. 2, the cylindrical wall 32 and shoulder 35 of socket 10 together with the outer peripheral surface of pilot portion 22 and the shoulder 23 of plug 12 form a substantially enclosed, annular cavity of a predetermined axial width and predetermined radial width in which the seal ring 25 is compressibly received.

The socket 10, adjacent to the free end thereof, is provided with an annular flange on the exterior thereof including a conical or rearwardly rising, cam or ramped forward surface 36 that terminates at a ridge or radial stop shoulder 37 which extends radially inward from the highest portion of the ramped forward surface 36 toward the main body portion of the socket 10.

Plug 12 carries the retention cup 15 of tandem snap ring retainer 14 and it includes a disk base 40 which is provided with a central aperture 41 to slidably receive the tube of plug 12 behind the bead 21 thereon so that the disk base can abut against the shoulder 24 of this inboard bead 21 to thereby limit axial movement of the retention cup 15 in one direction. The retention cup 15 is mounted on the plug 12 so that the annular rim 42 thereof, which extends from disk base 40, is positioned to encircle the socket 10 when the plug is inserted therein. As best seen in FIGS. 1 and 3, the rim 42 is provided with axially spaced apart sets of diametrically opposed pairs of openings 43 therethrough into which the legs of the tandem snap ring 16 can be inserted.

Tandem snap ring 16, as best seen in FIG. 4, in the form of a loop spring open at one end, is pierced and bent to provide a tandem pair of snap rings, each snap ring having a pair of leaf spring-like legs, each pair of legs being adapted to snap behind the shoulder 37 of socket 10 to serve as detents. In effect, the tandem snap ring 16 is a unitary tandem snap ring having a pair of hair pin type retainer clips or snap rings in spaced apart relation to each other. Each such snap ring is provided with a pair of legs formed by a pair of spaced apart straight segments 50 connected together at one end by an arcuate shaped mounting base segment 51 that is a central portion or common mounting base for both snap rings and is of a curvature to fit rim 42. Each segment 50 is connected at its other end to a semi-circular bent detent or lock segment 52, the opposite end of each lock segment 52 being connected to one end of a slightly outward turned segment 53 that in turn is connected to a further outward turned extension segment 54.

As seen in FIG. 3, the tandem snap ring 16, as assembled to the retainer cup 15, has the mounting base segment 51 suitably fixed to the exterior of rim 42, as by rivets 55, each rivet extending through an aperture 56 in the mounting base segment 51, and an aperture 44 in the rim 42, and as thus assembled, the segments 50 extend through the openings 43 of the rim on the side thereof to which the segment 51 is secured, the segments 53 extending through the corresponding diametrically opposed openings 43 on the other side of the rim with the extension segments 54 then extending radially outward from the rim 42 to permit access to these segments 54 whereby to effect manual separation of a desired set of a pair of the leaf spring legs.

The pair of bent detent or lock segments 52 of each snap ring oppose each other and, in their free form are spaced apart a distance substantially less than the maximum outside diameter of the cam surface 36 of socket 10.

Thus, with reference to FIG. 3, the left-hand pair of legs form an inboard retainer clip or snap ring adapted to effect a primary locking of the plug 12 in socket 10 by engagement against the shoulder 37 and the right-hand pair of legs form an outboard retainer clip or snap ring adapted to effect a secondary locking of the plug 12 in socket 10.

Again referring to FIG. 4, the interconnection of the opposite ends of a lock segment 52 to its adjoining segments 50 and 53 are effected along lines inclined at an angle other than a right angle to the sides of these segments so that in the assembled position of the tandem snap ring 16 to the retainer cup 15, the lock segments 52, as best seen in FIG. 2, are inclined at an acute angle to the axis of the rim 42 so that these segments 52 are inclined radially outward adjacent their outboard edges, the right-hand edges of the segments as seen in FIG. 3, for a purpose which will become apparent.

The legs of each snap ring are sufficiently resilient so as to flex outwardly to ride over the cam surface 36 when cammed outwardly as the plug 12 is inserted into the socket 10 and the tandem snap ring retainer 14 is axially moved into position with the retention cup 15 positioned to encircle the socket with the plug engaged therein. These snap rings will, however, snap back into position to retain the plug against disengagement from the socket.

Thus, to effect mating of the two conduits, it is necessary to press the plug 12 fully into the socket 10 and by applying an axial force on the tandem snap ring retainer 14, first the outboard snap ring, the right-hand snap ring with reference to FIG. 2, and then the inboard snap ring will be cammed over the annular flange, the latter engaging the shoulder 37, as seen in FIG. 2, to serve as a primary lock to retain the plug 12 in a fully inserted and sealed relationship with socket 10.

To release the plug 12 from socket 10, the extension segments 54 of the inboard snap ring are spread apart to effect disengagement of the detent portion 52 from shoulder 37. This permits any pressure within the system to push the plug 12 outwardly relative to socket 10 until the shoulder 37 of the socket engages the outboard snap ring to retain the plug 12 within socket 10 at an axial blow-down position at which the seal ring 25 is out of sealing engagement with wall 32. After fluid pressure is completely or substantially bled off, the outboard snap ring can be disengaged from shoulder 37 and thus permit complete disengagement of plug 12 relative to socket 10.

The detailed description of the preferred embodiment of the invention for the purpose of explaining the principles thereof is not to be considered as limiting the invention, as many modifications may be made by those skilled in the art. For example, although the retention cup 15 of the tandem snap ring retainer is loosely mounted on the tube end of plug 12 to permit complete and easy serviceability, it will be apparent that, if desired, it may be fixed as by welding to the tube end of plug 12 or to the bead 21 thereof. In addition, the beads 20 and 21 may be replaced by a single bead, not shown, to provide the axially spaced apart shoulders 23 and 24.

What is claimed is:

1. A conduit coupling comprising a tubular socket member having a stepped bore therethrough and defining at one end thereof a socket and having an annular flange on the exterior thereof providing a ramped forward surface adjacent to said one end which terminates at a shoulder extending radially inward, a tubular plug member having a plug portion at one end thereof slidably received in said socket and in sealing relation to said socket when fully inserted therein, said plug member including a tube having annular bead means on the exterior thereof defining a first shoulder and an axially spaced apart, opposed second shoulder, said first shoulder having a cylindrical pilot portion extending therefrom to the free end of said tubular plug member, and a seal ring encircling said pilot portion, a portion of said annular bead means including said first shoulder, said pilot portion and said seal ring defining said plug portion, said stepped bore being defined by a first annular wall extending from said one end and of a diameter to slidably receive said annular bead means defining said first shoulder, a second annular wall of reduced diameter with an intervening radial shoulder therebetween and a third annular wall of a diameter to slidably receive said pilot portion of said plug member with an intervening second radial shoulder therebetween, the axial extent of said third annular wall being greater than the axial extent of said pilot portion, whereby when said plug member is fully inserted into said socket, said first shoulder is in abutment with said radial shoulder, said first shoulder and said pilot portion forming with said second annular wall and said second radial shoulder a substantially enclosed annular cavity of a predetermined axial width and radial width in which said seal ring is compressibly received when said plug member is fully inserted into said socket member, and an outer retainer means, said outer retainer means including an apertured cup member operatively connected to said tubular plug member and having an annular rim extending over and encircling said plug portion, said rim having diametrically opposed axially spaced apart openings therethrough and a unitary tandem snap ring having a mounting base fixed to the exterior of said cup and having axial spaced apart pairs of spring legs extending therefrom through said openings, one pair of said spring legs being engageable with said shoulder when said plug portion is fully inserted in said socket and the other pair of said spring legs being engageable with said shoulder to retain said plug portion within but in nonsealing engagement with said socket.

2. A conduit coupling comprising a tubular plug member including a tube having an annular bead means on the exterior thereof providing at least a first shoulder and a second shoulder axially spaced from said first shoulder and having a cylindrical pilot portion extending from said first shoulder to a free end of said tube and a seal ring encircling said pilot portion, a tubular socket member having a stepped bore extending from one end and defining a socket with internal annular walls including a first wall extending from said one end and of a diameter greater than the outside diameter of said bead means, a second wall providing an annular seat for said seal ring with an intervening radial shoulder therebetween and a third wall slidably receiving said pilot portion with an intervening second radial shoulder between said second wall and said third wall, said tubular plug member being slidably received in said socket and in sealing relation thereto when fully inserted therein with said first shoulder in abutment against said radial shoulder, said first shoulder and said pilot portion of said tubular plug and said second wall and said second radial wall of said socket member defining a substantially enclosed annular cavity of a predetermined axial width and radial width in which said seal ring is compressibly received when said tubular plug is fully inserted into said socket member, said tubular socket member having an annular radial flange on the exterior providing a ramped forward surface and a radial shoulder and, an outer retainer means positioned on said tubular plug member for engagement against said second shoulder, said outer retainer means including an annular rim means encircling said plug portion in radial spaced relationship thereto, said rim means having axial and circumferentially spaced apart openings therethrough, and a unitary tandem snap ring means supported by said rim means and providing axially spaced apart pairs of spring legs extending through said rim through said openings therein and positioned to be engaged by said ramped forward surface whereby each pair of spring legs is adapted to be sequentially deflected outward and to snap inward to engage said radial shoulder of said tubular socket member thereby retaining said tubular plug in a sealing or a nonsealing position in said socket.

3. A conduit coupling according to claim 2 wherein said tandem snap ring includes an arcuate shaped base segment fixed to the exterior of said rim means, and axially spaced apart pairs of spring legs, said spring legs being connected together at one end by said base segment, each said spring leg including an intermediate semi-circular lock segment portion inclined at an acute angle to the axis of said rim means in a direction corresponding to said ramped forward surface of said tubular socket when said tubular socket is mated to said plug member.

* * * * *